United States Patent [19]

Kiisler et al.

[11] 4,172,042

[45] Oct. 23, 1979

[54] HEAT-INSULATING MATERIAL

[76] Inventors: Karl R. Kiisler, ulitsa Yakhimekhe, 26; Tiit K. Kaps, ulitsa Retke, 24, kv. 55; Peep G. Kristyanson, ulitsa Sjutiste, 34, kv. 38; Jury F. Vabaoya, ulitsa Suurtjuki, 5, kv. 1; Tynu A. Kumari, ulitsa Tammesalu, 2; Anne A. Tynnisson, ulitsa Rakhe, 27, all of Tallin; Vladimir A. Zdon, ulitsa Krasnoarmeiskaya, 85/87, kv. 134; Eduard M. Dolgy, Rusanovskaya naberezhnaya 16, kv. 73, both of Kiev; Ivar K. Roox, ulitsa Komsomoli, 24, kv. 27, Estonskaya, all of U.S.S.R.; Gurgen K. Avakian, deceased, late of Kiev, U.S.S.R., by Vitaly G. Avakian, administrator

[21] Appl. No.: 862,643

[22] Filed: Dec. 20, 1977

[51] Int. Cl.² .............................................. C04B 43/12
[52] U.S. Cl. ...................................... 252/62; 252/8.1; 428/921
[58] Field of Search ................... 252/62, 8.1; 427/389, 427/385 B; 428/920, 921, 524; 260/51.5, 54

[56] References Cited

U.S. PATENT DOCUMENTS

| | | | |
|---|---|---|---|
| 2,633,433 | 3/1953 | Hollenberg | 252/62 X |
| 3,408,316 | 10/1968 | Mueller et al. | 260/17.2 |
| 3,770,466 | 11/1973 | Wilton | 106/56 |
| 3,963,652 | 6/1976 | Tanimura et al. | 260/3 |

FOREIGN PATENT DOCUMENTS

| | | |
|---|---|---|
| 2604756 | 8/1976 | Fed. Rep. of Germany . |
| 1467645 | 12/1966 | France . |
| 1273152 | 5/1972 | United Kingdom . |
| 451676 | 5/1972 | U.S.S.R. . |

*Primary Examiner*—P. E. Willis, Jr.
*Attorney, Agent, or Firm*—Lackenbach, Lilling & Siegel

[57] ABSTRACT

A heat-insulating material comprising from 85 to 98 parts by weight of mineral wool and from 15 to 2 parts by weight of a binder applied onto the wool, which is a modified resol phenol-formaldehyde resin on the basis of phenol, formaldehyde, sodium hydroxide, a water proofing additive which is an individual alkylresorcinol with a number of side chain carbons of 2 to 8 or a mixture of alkylresorcinols, as well as urea, or dicyandiamide, or melamine, the ratio between said components being as follows (parts by weight):

| | |
|---|---|
| phenol | 1 |
| formaldehyde | 0.74–0.96 |
| sodium hydroxide | 0.03–0.05 |
| alkylresorcinol with a number of side chain carbons of 2 to 8, or a mixture of alkylresorcinols | 0.075–0.45 |
| urea, or dicyandimaide, or melamine | 0.15–0.35 |

The proposed heat-insulating material features improved adhesion properties, has a reduced water absorption and an increased moisture resistance.

7 Claims, No Drawings

HEAT-INSULATING MATERIAL

FIELD OF THE INVENTION

The present invention relates to the production of construction materials and, more specifically, to compositions of heat-insulating materials, which may find application for warming precast concrete elements, for insulating walls, roofs, pipelines, tanks and cisterns.

BACKGROUND OF THE INVENTION

Known in the art is a heat-insulating material comprising from 85 to 98 parts by weight of mineral fiber and from 15 to 2 parts by weight of a binder applied onto said fiber, which is a modified resol phenol-formaldehyde resin on the basis of phenol, a 50% aqueous solution of formaldehyde, barium hydroxide, dicyandiamide, water, and sulphuric acid. For preparing the binder, the following ratio of the components is taken (in parts by weight):

| | |
|---|---|
| phenol | −100 |
| 50% aqueous solution of formaldehyde | −154 |
| barium hydroxide | −15 |
| dicyandiamide | −35 |
| water | −24.1 |
| Sulphuric acid up to a certain ph. | |

The heat-insulating material including mineral fiber and a binder of the above composition possesses improved adhesive properties as compared to a heat-insulating material containing sodium hydroxide in the binder composition, but the binder stability deteriorates.

The life of the binder, which is a component of the aforementioned heat-insulating material at a temperature of +5° C. (special thermostated tanks are required) is 4 weeks.

As the binder does not contain any waterproofing additives, the heat-insulating material on its basis does not have water repellent properties.

Also known in the art is a heat-insulating material comprising mineral fiber and a binder applied onto the fiber, which is a modified resol phenol-formaldehyde resion on the basis of phenol, formaldehyde, barium hydroxide, water, urea or melamine.

There is also known a heat-insulating material comprising mineral fiber and a binder applied onto the said fiber, which is a modified resol phenol-formaldehyde resin on the basis of phenol, a 37% aqueous solution of formaldehyde, dicyandiamide, sodium hydroxide, boric acid and a waterproofing additive γ-aminopropyltriethoxysilane (Silane "A-1100").

For preparing the binder which is a component of the heat-insulating material, the following components are taken, in parts by weight:

| | |
|---|---|
| phenol | −100 |
| 37% aqueous solution of formaldehyde | −340 |
| dicyandiamide | −40 |
| sodium hydroxide | −3.7 |
| silane "A-1100" | −0.001–2 wt. % of the resulting phenol-formaldehyde resin weight |
| boric acid up to pH | = 7.5–8.0 |

A modified resol phenol-formaldehyde resin on the basis of phenol, a 37% aqueous solution of formaldehyde, dicyandiamide, sodium hydroxide, silane "A-1100" and boric acid are prepared in the following manner.

A reactor provided with an agitator, a return condenser and a heater element is charged with 100 parts by weight of phenol, 340 parts by weight of a 37% aqueous solution of formaldehyde, and 3.7 parts by weight of sodium hydroxide. pH of the solution in the reactor should lie within the range of 8.5 to 9.0.

The process is conducted at a temperature of 70° C. till the concentration of free formaldehyde in the reaction medium drops below 12% by weight.

The mixture is cooled to a temperature of 40° to 50° C. and the medium is neutralized with boric acid to pH=7.5–8.0. Then, 40 parts by weight of dicyandiamide are added to the reactor, and the mixture is heated to a temperature of 60° to 70° C. Immediately after dissolution of dicyandiamide, the resulting modified resol phenol-formaldehyde resin is cooled to a temperature of 40° C. and from 0.001 to 2% by weight of silane "A-1100" are added thereto.

A disadvantage of the above heat-insulating material is the complexity of synthesis and the high cost of the waterproofing additive, namely, γ-aminopropyltriethoxysilane (A-1100), used in the binder. Besides, it is known that silane "A-1100" is an effective waterproofing agent only for mineral fibers, having a high acidity index ($M_a$=2.28–2.41).

SUMMARY OF THE INVENTION

It is an object of the present invention is to introduce into the binder a readily available and easily prepared waterproofing additive permitting a reduction in the moisture absorption and an increase in the moisture resistance of the heat-insulating material.

This object is accomplished with a heat-insulating material comprising from 85 to 98 parts by weight of mineral wool and from 15 to 2 parts by weight of a binder applied onto said wool, which is a modified resol phenol-formaldehyde resin on the basis of phenol, formaldehyde, sodium hydroxide, a waterproofing additive, as well as urea, or dicyandiamide, or melamine. According to the invention, the waterproofing additive is an individual alkylresorcinol with from 2 to 8 side chain carbons, or a mixture of alkylresorcinols, the ratio between phenol, formaldehyde, sodium hydroxide, alkylresorcinols, as well as urea, or dicyandiamide, or melamine, being as follows (parts by weight):

| | |
|---|---|
| phenol | −1 |
| formaldehyde | −0.74–0.96 |
| sodium hydroxide | −0.03–0.05 |
| alkylresorcinol with a number of side chain carbons of from 2 to 8, or a mixture of alkylresorcinols | −0.075–0.45 |
| urea, or dicyandiamide, or melamine | −0.15–0.35 |

DETAILED DESCRIPTION OF THE INVENTION

The proposed invention is embodied in the following manner.

A reactor provided with a mechanical agitator, a thermometer and return condenser is charged, at a temperature of 46° to 70° C., with 100 parts by weight of phenol, from 3 to 5 parts by weight of sodium hydroxide (as a 20% aqueous solution), and from 74 to 96 parts by weight of formaldehyde (as a 37% aqueous solution).

Polycondensation is conducted with continuous stirring at a temperature of 50° to 60° C. for 6 to 10 hours. Then, the reactor is charged with 7.5 to 45 parts by weight of a mixture of alkyl resorcinols or an individual alkylresorcinol with 2 to 8 side chain carbons, and polycondensation is continued at a temperature of 50° to 70° C. for 1.5 to 4 hours. Thereafter, the reactor is charged with 15 to 35 parts by weight of urea, or dicyandiamide, or melamine, and polycondensation is conducted for 0.5 to 2.5 hours at a temperature of 50° to 70° C.

In order to obtain a heat-insulating material, the obtained aqueous solution of the binder, which is a modified resol phenol-formaldehyde resin, is applied onto mineral wool by way of spraying into a fiber-settling chamber or impregnating the mineral fiber, with subsequent heat treatment of the heat-insulating material. The selection of the ratio between the starting components for obtaining the binder according to the present invention ensures, after three months of storage, a binder viscosity of up to 150 cs and adequate miscibility with water 1:5, besides, minimum quantities of free phenol, up to 2.0 wt %, formaldehyde, up to 2.5 wt %, and an alkali, up to 0.6 wt. %, are achieved. Due to the introduction of the waterproofing additive into the binder composition, namely, alkylresorcinol with 2 to 8 side chain carbons or a mixture of alkylresorcinols, moisture does not permeate through the contact surface between the cured binder and the mineral fiber, which are the components of the heat-insulating material.

The adhesion of the heat-insulating material containing the proposed binder is 15% higher than in that with a binder of the same composition but not containing alkylresorcinol besides, it has a reduced mass water absorption, 30 to 40% instead of 350 to 400%, and an increased moisture resistance (residual adhesion after 72 hours of storage in a humid atmosphere is 1.5 to 2 times higher).

Besides, the proposed material, as compared to heat-insulating materials manufactured by such well known companies as "Rockwool A B", Sweden, "Alström OY", Finland, "Jungers Verkstads A B", Sweden, containing in the binder composition special organosilicon additives, enables their replacement by simpler ones, such as alkylresorcinol or a mixture of alkylresorcinols. The water absorption of the aforementioned heat-insulating materials is from 30 to 45%.

The moisture resistance of the proposed and prior art binders included in heat-insulating materials is tabulated below.

| Binder 1 | Adhesion, kg | | |
|---|---|---|---|
| | Dry Sample 2 | Sample after 72 hrs of storage in a humid atmosphere 3 | % of initial 4 |
| odified resol phenol-formaldehyde resin on the basis of phenol, formaldehyde, sodium hydroxide, urea, taken in the following ratio (parts by weight): phenol - 100 formaldehyde - 23.3 sodium hydroxide - 22.5 urea - 17.9 | 6.4 | 2.2 | 34.3 |
| The same composition as above, the binder also including composition 22.8 parts by weight of a waterproofing additive- a mixture of shale alkylresorcnols of the following composition, in parts by weight: resorcinol - 3 5-methylresorcinol - 45 5-ethylresorcinol - 10 4,5-dimethylresorcinol-9 2,5-dimethylresorcinol - 15 higher homologs of alkylresorcinols - 18 | 7.3 | 4.1 | 56.1 |
| The same composition as above, except that the waterproofing additive is 20 parts by weight of hexylresorcinol | 8.3 | 5.9 | 71.1 |
| The same composition as above, except that the waterproofing additive is γ-aminopropylethoxysilane in an amount of 2 wt % of the resulting resin weight | 7.7 | 4.6 | 59.7 |

For a better understanding of the present invention, the following examples of its practical embodiment are given by way of illustration.

EXAMPLE 1

A reactor provided with a mechanical agitator, a thermometer, and a return condenser is charged, at a temperature of 55°±3° C. with 100 parts by weight of phenol, 233 parts by weight of a 37% aqueous solution of formaldehyde, and 22.5 parts by weight of a 20% aqueous solution of sodium hydroxide. Polycondensation is conducted at the same temperature for 8 hours. Then, the reactor is charged with a waterproofing additive, namely, 22.8 parts by weight of a mixture of alkylresorcinols, and further polycondensation is conducted at a temperature of 60°±3° C. for 2.5 hours. The last to be charged into the reactor are 17.9 parts by weight of urea, and the mixture is subjected to polycondensation at a temperature of 65°±3° C. for 1.5 hours.

In order to obtain a heat-insulating material, an aqueous solution (dilution ratio of 1:5) of the binder obtained above, which is a modified resol phenol-formaldehyde resin, is applied onto mineral wool by a known method and is then subjected to heat treatment at a temperature of 140° to 200° C. for 30 minutes.

As the mixture of alkylresorcinols use is made of the product of heat treatment of oil shale, which is a mixture of various alkyl derivatives of resorcinol of the following average composition (in parts by weight):

| resorcinol | —3 |
| 5-methylresorcinol | —45 |
| 5-ethylresorcinol | —10 |
| 4,5-dimethylresorcinol | —9 |
| 2,5-dimethylresorcinol - | —15 |
| higher homologs of alkylresorcinols | —18 |

The resulting binder has a refractive coefficient $n_D = 1.465$ at a temperature of 20° C.

The obtained heat-insulation material possesses the following properties:

| adhesion | −6.1 kg |
|---|---|
| mass water absorption | −37.4% | and contains 3.3 parts by weight of the binder. Adhesion is determined by measuring the force of pulling a thread from glass fabric filament, impregnated and cured with the binder included in the heat-insulating material. (cf. R. P. Uchingens and H. Sh. Girzonas, "Determination of Adhesion of Phenol-Formaldehyde Resins to Glass Fibres". Collection of Papers of the Heat Insulation Research Institute, Vilnius, No. 6, 1972).

EXAMPLE 2

The process is conducted in a manner similar to that described in Example 1, except that the reactor is charged with 200 parts by weight of 37% aqueous solution of formaldehyde and, as the waterproofing additive, 7.5 parts by weight of an alkylresorcinol mixture of the composition described in Example 1.

The resulting binder has a refractive coefficient $n_D = 1.467$ at a temperature of 20° C.

In order to obtain a heat-insulating material, the binder which is a modified resol phenol-formaldehyde resin, in the form of an aqueous solution (dilution ratio of 1:5), is applied onto mineral wool by a known method and the obtained heat-insulating material is subjected to heat treatment at a temperature of 140° to 200° C. for 30 min.

The obtained heat-insulating material possesses the following properties:

| adhesion | −6.8 kg |
|---|---|
| mass water absorption | −51.5% | and contains 3.7 parts by weight of the binder.

EXAMPLE 3

The binder is synthesized as in Example 1, but the reactor is charged with 260 parts by weight of a 37% aqueous solution of formaldehyde and, as the waterproofing additive, 45 parts by weight of an alkylresorcinol mixture of the composition described in Example 1. The resulting binder which is a modified resol phenol-formaldehyde resin has a refractive coefficient $n_D = 1.465$ at a temperature of 20° C.

In order to obtain a heat-insulating material, the binder, in the form of an aqueous solution (dilution ratio of 1:5), is applied onto mineral wool by a known method, and the heat-insulating material is subjected to heat treatment at a temperature of 140° to 200° C. for 30 minutes.

The heat-insulating material possesses the following properties:

| adhesion | −8.1 kg |
|---|---|
| mass water absorption | −38% | and contains 2.0 parts by weight of the binder.

EXAMPLE 4

The binder is synthesized as in Example 1, but the reactor is charged with 20 parts by weight of 4-hexylresorcinol as the waterproofing additive.

The resulting binder which is a modified resol phenolformaldehyde resin has a refractive coefficient $n_D = 1.466$ at a temperature of 20° C.

In order to obtain a heat-insulating material, the resulting binder, in the form of an aqueous solution (dilution ratio of 1:5), is applied onto mineral wool by a known method, and the obtained heat-insulating material is subjected to heat treatment at a temperature of 140° to 200° C. for 30 min.

The heat-insulating material possesses the following properties:

| adhesion | −8.3 kg |
|---|---|
| mass water absorption | −34% | and contains 3.9 parts by weight of the binder.

EXAMPLE 5

The binder is synthesized as in Example 1, but the reactor is charged with 35 parts by weight of 5-ethylresorcinol as the waterproofing additive.

The resulting binder which is a modified resol phenolformaldehyde resin has a refractive coefficient $n_D = 1.465$ at a temperature of 20° C.

In order to obtain a heat-insulating material, the resulting binder, in the form of an aqueous solution (dilution ratio of 1:5), is applied onto mineral wool by a known method, then the obtained heat-insulating material is subjected to heat treatment at a temperature of 140° to 200° C. for 30 minutes.

The heat-insulating material possesses the following properties:

| adhesion | −7.8 kg |
|---|---|
| mass water absorption | −40% | and contains 4.2 parts by weight of the binder.

EXAMPLE 6

The binder is synthesized as in Example 1, except that 35 parts by weight of urea are taken.

The resulting binder which is a modified resol phenolformaldehyde resin has a refractive coefficient $n_D = 1.470$ at a temperature of 20° C.

In order to obtain a heat-insulating material, the resulting binder, in the form of an aqueous solution (dilution ratio of 1:5), is applied onto mineral wool by a known method, and the obtained heat-insulating material is subjected to heat treatment at a temperature of 140° to 200° C. for 30 min.

The heat-insulating material possesses the following properties:

| adhesion | −7.3 kg |
|---|---|
| mass water absorption | −50% | and contains 15 parts by weight of the binder.

EXAMPLE 7

Synthesis is conducted in a manner similar to that described in Example 1, but, instead of urea, the reactor is charged with 25 parts by weight of melamine.

The resulting binder which is a modified resol phenol-formaldehyde resin has a refractive coefficient $n_D = 1.469$ at a temperature of 20° C.

In order to obtain a heat-insulating material, the resulting binder, in the form of an aqueous solution (dilution ratio of 1:5), is applied onto mineral wool, and the obtained heat-insulating material is subjected to heat treatment at a temperature of 140° to 200° C. for 30 min.

The heat insulating material possesses the following properties:

| adhesion | −6.9 kg |
|---|---|
| mass water absorption | −42% | and contains 5.9 parts by weight of the binder.

EXAMPLE 8

Synthesis is conducted as in Example 1, but, instead of urea, the reactor is charged with 25 parts by weight of dicyandiamide.

The resulting binder which is a modified resol phenolformaldehyde resin has a refractive coefficient $n_D = 1.468$ at a temperature of 20° C.

In order to obtain a heat-insulating material, the resulting binder, in the form of an aqueous solution (dilution ratio of 1:5), is applied onto mineral wool, and the obtained heat-insulating material is subjected to heat treatment at a temperature of 140° to 200° C. for 30 minutes.

The heat-insulating material possesses the following properties:

| adhesion | −6.8 kg |
|---|---|
| mass water absorption | −39% | and contains 5.1 parts by weight of the binder.

EXAMPLE 9

The reactor provided with a mechanical agitator, a thermometer, and a return condenser is charged at a temperature of 50°±3° C., with 100 parts by weight of phenol, 200 parts by weight of a 37% aqueous solution of formaldehyde, and 15 parts by weight of a 20% aqueous solution of sodium hydroxide. Polycondensation is conducted at the same temperature for 6 hours. Then, the reactor is charged with a waterproofing additive, namely, 7.5 parts by weight of a mixture of alkylresorcinols of the composition as described in Example 1. Polycondensation is conducted at a temperature of 55°±3° C. for 2.5 hours. The last to be charged into the reactor are 15 parts by weight of urea, and the mixture is subjected to polycondensation at a temperature of 55°±3° C. for 0.5 hours.

In order to obtain a heat-insulating material, an aqueous solution (dilution ratio of 1:5) of the resulting binder which is a modified resol phenol-formaldehyde resin is applied onto mineral wool by a known method, and the obtained heat-insulating material is subjected to heat treatment at a temperature of 140° to 200° C. for 30 minutes.

The resulting binder, a modified resol phenol-formaldehyde resin, has a refractive coefficient $n_D = 1.466$ at a temperature of 20° C.

The obtained heat-insulating material possesses the following properties:

| adhesion | −6.4 kg |
|---|---|
| mass water absorption | −50% | and contains 5 parts by weight of the binder.

EXAMPLE 10

The reactor provided with a mechanical agitator, a thermometer, and a return condenser is charged, at a temperature of 65°±3° C., with 100 parts by weight of phenol, 260 parts by weight of a 37% aqueous solution of formaldehyde, and 25 parts by weight of a 20% aqueous solution of sodium hydroxide.

Polycondensation is conducted at the same temperature for 10 hours. Then, the reactor is charged with a waterproofing additive, i.e. 45 parts by weight of a mixture alkylresorcinols of the composition as described in Example 1. Polycondensation is conducted at a temperature of 65°±3° C. for 4 hours. The last to be charged into the reactor are 35 parts by weight of urea and the mixture is subjected to polycondensation at a temperature of 65°±3° C. for 2.5 hours.

In order to obtain a heat-insulating material, an aqueous solution (dilution ratio of 1:5) of the resulting binder which is a modified resol phenol-formaldehyde resin is applied onto mineral wool by a known method, and the obtained heat-insulating material is subjected to heat treatment at a temperature of 140° to 200° C. for 30 minutes.

The resulting binder, a modified resol phenol-formaldehyde resin, has a refractive coefficient $n_D = 1.469$ at a temperature of 20° C.

The obtained heat-insulating material possesses the following properties:

| adhesion | −7.5 kg |
|---|---|
| mass water absorption | −45% | and contains 15 parts by weight of the binder.

What is claimed is:

1. A heat-insulating composition consisting essentially of from 85 to 98 parts by weight of mineral wool and from 15 to 2 parts by weight of a binder applied onto said wool, the binder being a modified resol phenol-formaldehyde resin based on phenol, formaldehyde, sodium hydroxide, a waterproofing additive selected from the group consisting of an individual alkylresorcinol with 2 to 8 side chain carbons, and mixtures thereof, and nitrogenated compounds selected from the group consisting of urea, dicyandiamide, and melamine, the ratio between said phenol, formaldehyde, sodium hydroxide, alkylresorcinols, and nitrogenated compounds being as follows in parts by weight:

| phenol | 1 |
|---|---|
| formaldehyde | 0.74–0.96 |
| sodium hydroxide | 0.03–0.05 |
| Waterproofing additive selected from the group consisting of individual alkylresorcinol with 2 to 8 side chain carbons, and mixtures thereof | 0.075–0.45 |

| | |
|---|---|
| -continued | |
| nitrogenated compound selected from the group consisting of urea, dicyandiamide, and melamine | 0.15–0.35 |

2. The composition of claim 1, wherein said waterproofing additive is selected from the group consisting of resorcinol, 5-methylresorcinol, 5-ethylresorcinol, 4,5-dimethylresorcinol, 2,5-dimethylresorcinol, and higher homologs of alkylresorcinol.

3. The composition of claim 2 wherein said waterproofing additive is 5-ethylresorcinol.

4. The composition of claim 1 wherein said waterproofing additive is hexylresorcinol.

5. The composition of claim 1 wherein said nitrogenated compound is urea.

6. The composition of claim 1 wherein said nitrogenated compound is melamine.

7. The composition of claim 1 wherein said nitrogenated compound is dicyandiamide.